No. 722,380. PATENTED MAR. 10, 1903.
E. OTTENBACHER.
AXLE BOX.
APPLICATION FILED JULY 8, 1902.
NO MODEL.
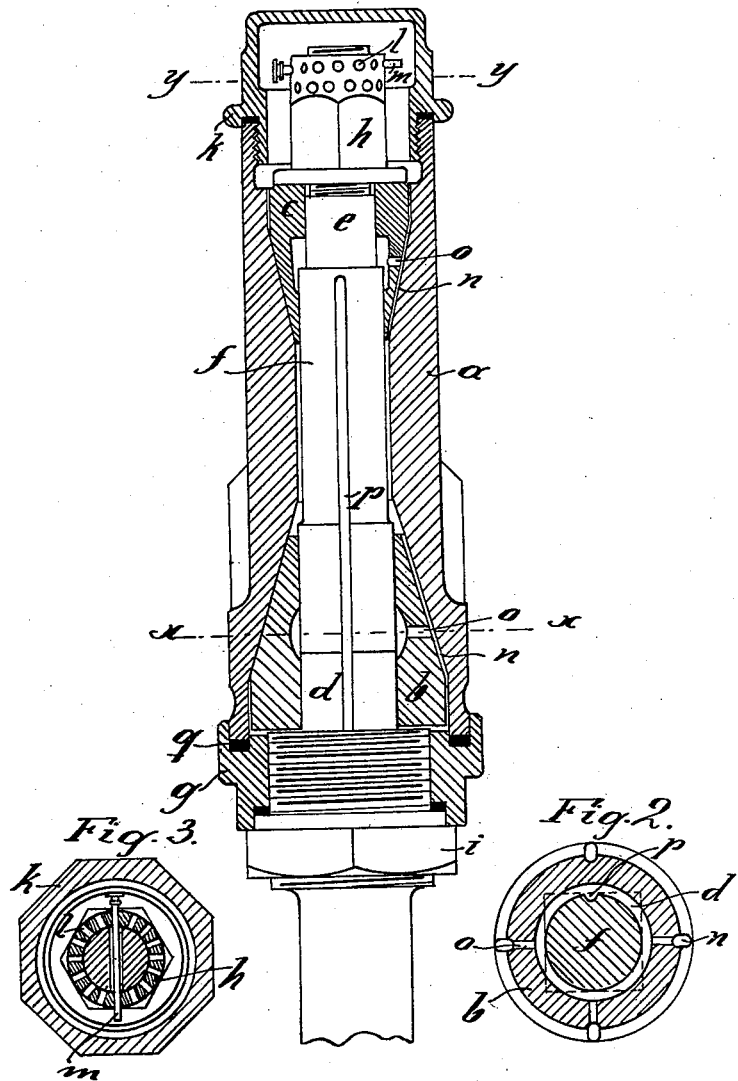
INVENTOR.
B. W. Aldon
Carrie Judge.
INVENTOR.
Ernst Ottenbacher
BY
ATTORNEYS.

UNITED STATES PATENT OFFICE.

ERNST OTTENBACHER, OF BIBERACH, GERMANY.

AXLE-BOX.

SPECIFICATION forming part of Letters Patent No. 722,380, dated March 10, 1903.

Application filed July 8, 1902. Serial No. 114,802. (No model.)

*To all whom it may concern:*

Be it known that I, ERNST OTTENBACHER, carriage-builder, a subject of the King of Würtemberg, and a resident of Biberach-on-the-Ruhr, in the Kingdom of Würtemberg and Empire of Germany, have invented certain new and useful Improvements in Axle-Boxes, (for which I have filed patent applications in Germany, dated May 21, 1902; in France, dated May 27, 1902; in Austria, dated May 24, 1902, and in England, dated May 28, 1902,) of which the following is a specification.

This invention relates to an improved axle, more especially intended for carriages and the like, in which the friction-surfaces of the shanks of the axle rotating in the nave box or bush, which, in consequence of the action of the weight of the carriage and the load, have to bear the greatest strain toward the interior wall of the nave-box, and are therefore subjected to the greatest wear and tear, may be interchanged without removing the axle, while simultaneously the so-called "rattling" of the bush may be obviated or prevented at any moment.

The invention is illustrated in the accompanying drawings, in which—

Figure 1 is a longitudinal section; Fig. 2, a cross-section on the line $x\,x$, while Fig. 3 is a cross-section on the line $y\,y$.

Similar letters refer to similar parts throughout the several views.

For the purpose of attaining the desired interchangeability of the worn portions of the axle in the wheel-bush $a$ two conical rings $b$ and $c$ are slid upon the said axle and are longtudinally movable upon square surfaces of the otherwise round section axle-shank $f$, the facing ends of the said conical rings being adjustable by means of the nuts $g\,h$, which act upon the cylindrical portion of the ring in such a manner that the frictional surfaces even when worn down can always be adjusted so as to present a bearing-surface toward each other.

To effect an exact mounting and dismounting of the two nuts $g$ and $h$, a counter-nut $i$ is employed which presses the rear and larger cone $b$ forward, while the nut serving to tighten up the small cone $c$ is provided with a number of diametrical holes $l$, by means of which after every slight turn it can be secured in position by means of a cotter-pin $m$.

A cap-nut $k$ closes the front of the bush $a$ and prevents at this point the inlet of dust as well as the escape of lubricating material, this object being effected on the other side of the axle by the end wall of the bush engaging in a ring groove $q$ of the nut $g$.

The bush $a$ bears only upon the conical portions of the two rings $b$ and $c$ and is neither in contact with the cylindrical projection of the latter nor with the cylindrical portion of the axle between the cones. The wear upon the inner surfaces coming into play of the axle is of course completely uniform. The wear upon the stationary cone is principally on the lowest part of its circumference, where the most frictions take place. As the rings $b\,c$ rest upon square or four-cornered surfaces, it will be clear that an interchange of the part most exposed to wear may be effected by changing the conical ring to another square and unworn surface, and, lastly, after the said two conical rings have been used on all sides reserve pieces (rings) may be quickly inserted without removing the axle, which thus remains intact.

Hollow spaces in the two conical rings $b\,c$ and longitudinal slots $n$ upon the surface, connected by slots $o$ with these chambers, in coöperation with a longitudinal groove $p$ upon the axle-shank, allow of a rational oiling of the parts.

What I claim, and desire to protect by Letters Patent of the United States, is—

In combination with an axle and the axle-box $a$, cones $b$ and $c$ on the axle, adjustable longitudinally, a nut $h$ for adjusting the cone $c$ with means for holding the nut in any position to which it may be adjusted and a nut $g$ and counter-nut $i$ for adjusting the cone $b$, said nuts $h$ and $g$ acting against the large ends of their respective cones which are directed outwardly, substantially as described.

In testimony whereof I have hereunto set my hand in presence of two witnesses.

ERNST OTTENBACHER.

Witnesses:
CHR. ALBERT BAUER,
ERNST ENTERMAN.